(12) United States Patent
Reuker

(10) Patent No.: US 6,799,722 B2
(45) Date of Patent: Oct. 5, 2004

(54) CODE CARRIER DEVICE

(75) Inventor: Dieter Reuker, Stuttgart (DE)

(73) Assignee: Balluff GmbH, Neuhausen (DE)

(*) Notice: Subject to any disclaimer, the term of this patent is extended or adjusted under 35 U.S.C. 154(b) by 0 days.

(21) Appl. No.: 10/308,929

(22) Filed: Dec. 3, 2002

(65) Prior Publication Data
US 2003/0112127 A1 Jun. 19, 2003

(30) Foreign Application Priority Data
Dec. 4, 2001 (DE) .......................... 101 60 452

(51) Int. Cl.$^7$ .............................................. G06K 15/00
(52) U.S. Cl. ...................... 235/383; 235/375; 235/492
(58) Field of Search .................................. 235/492, 487, 235/383, 384, 380, 375

(56) References Cited

U.S. PATENT DOCUMENTS

| | | | | |
|---|---|---|---|---|
| 4,309,600 A | * | 1/1982 | Perry et al. ................ | 235/375 |
| 4,588,880 A | * | 5/1986 | Hesser ....................... | 235/376 |
| 5,689,239 A | * | 11/1997 | Turner et al. ............. | 340/10.3 |
| 5,742,237 A | * | 4/1998 | Bledsoe .................... | 340/825.49 |
| 5,780,826 A | * | 7/1998 | Hareyama et al. ........ | 235/385 |
| 5,804,810 A | * | 9/1998 | Woolley et al. ........... | 235/492 |
| 5,805,287 A | * | 9/1998 | Pettersen et al. .......... | 356/614 |
| 6,003,771 A | * | 12/1999 | Kusters ..................... | 235/383 |
| 6,641,042 B1 | * | 11/2003 | Pierenkemper et al. | 235/462.01 |

FOREIGN PATENT DOCUMENTS

| | | |
|---|---|---|
| DE | 696 00 910 | 3/1997 |
| DE | 200 19 248 | 4/2001 |
| EP | 0 762 535 | 3/1997 |
| EP | 0 783 190 | 10/2001 |

* cited by examiner

Primary Examiner—Karl D. Frech
(74) Attorney, Agent, or Firm—Barry R. Lipsitz; Douglas M. McAllister

(57) ABSTRACT

To provide a code carrier device for mounting on a material flow object, with a code carrier, which comprises a memory for storing an individual identification and a transmitter device for transmitting the identification, so that the identification can be contactlessly read by a receiver when the transmitter device and receiver are in a specific relative positional range in relation to each other, with which code carrier device the identification can be read in a simple way, it is proposed that the transmitter device has a first transmitting face and at least a second transmitting face, being transversely thereto, by means of which the identification can in each case be read, the readability being determined by the relative position between a receiver and a transmitting area.

23 Claims, 6 Drawing Sheets

CODE CARRIER DEVICE

The present disclosure relates to the subject matter disclosed in German application No. 10160 452.1 of Dec. 4, 2001, which is incorporated herein by reference in its entirety and for all purposes.

BACKGROUND OF THE INVENTION

The invention relates to a code carrier device for mounting on a material flow object, with a code carrier, which comprises a memory for storing an individual identification and a transmitter device for transmitting the identification, so that the identification can be contactlessly read by a receiver when the transmitter device and receiver are in a specific relative positional range in relation to each other.

Code carriers, such as transponders for example, are used to provide specific objects with an "unlosable" identification which can be contactlessly read and, if appropriate, written. For example, material flow objects such as pallets on an assembly line are provided with corresponding code carrier devices, to allow the content of the pallets to be contactlessly read electronically without having to stop the material flow, for example on an assembly line.

SUMMARY OF THE INVENTION

The present invention provides a code carrier device with which an identification of a material flow object can be read in a simple way. In accordance with the present invention, the transmitter device has a first transmitting face and at least a second transmitting face, being transversely thereto, by means of which the identification can in each case be read, the readability being determined by the relative position between a receiver and a transmitting face.

The fact that there are at least two transmitting faces allows the identification to be read with respect to at least two transversely disposed directions of movement of the material flow object. This allows that, with appropriate receivers, in particular receivers positioned in a fixed place, the identification can be read even if the material flow object changes its direction of movement; in particular, the at least two transmitting faces are in this case adapted to the possible directions of movement of the material flow object, that is to say the identification can be read via one transmitting face when there is movement of the material flow object in one specific direction and the identification can be read via the other transmitting face when there is movement in a direction transverse thereto.

A transmitting face is in this case an effective transmitting face via which an antenna of the transmitter device radiates signals which contain the identification.

In particular, a first energy flux density vector (Poynting vector) of the radiation, relative to the first transmitting face, and a second energy flux density vector, relative to the second transmitting face, which is in the same relationship with the second transmitting face as the first energy flux density vector is with the first transmitting face, are transversely in relation to each other. This means that the first transmitting face and the at least one further transmitting face have substantially the same radiation characteristic.

As a result, a receiver which is intended, for example, to read an identification when there is a transverse movement of the material flow object can then be positioned in the same way as a corresponding receiver which is intended to read the identification when there is a movement of the material flow object in a first direction.

A code carrier device can be produced in a simple and low-cost way if a transmitter of the transmitter device which forms a transmitting face comprises a coil. Such a transmitter or transponder can be inductively induced by means of a receiver, the receiver then at the same time supplying the energy which is in turn required for transmitting the identification.

It is advantageous if a transmitter comprises a toroidal coil. A toroidal coil can be produced at low cost and can also be arranged in a housing in a simple way in technical terms of production. Furthermore, a receiver may then also comprise a toroidal coil. If two toroidal coils are arranged parallel to each other, the field permeation is particularly great. As a result, the appropriate identification can be read from a code carrier in a simple and reliable way even at relatively great distances. In addition, it is also possible to use pot core halves for such toroidal coils, so that the latter can also be installed in steel.

In particular, an energy flux density associated with a transmitting face is free from nodes, so that a good radiation characteristic is accomplished, at least with respect to a half-space.

The transmitter device is advantageously arranged in a housing. In this respect, on the one hand said device is protected from external influences and on the other hand the transmitter device can then be attached to a material flow object in a specifically aligned manner.

In particular, the first transmitting face is arranged with respect to a first lateral face of the housing and the second transmitting face is arranged with respect to a second lateral face, which is transversely in relation to the first lateral face. As a result, the transmitter device is positioned in the housing with its transmitting faces specifically directed and, by appropriate positioning of the housing on the material flow object, these transmitting faces can in turn be aligned with respect to the directions of movement of the material flow object, so that, when appropriately mounted on the material flow object, it is possible to set the readability of the identification in such a way that it depends on the direction of movement of the material flow object.

In particular, it is then advantageous if a transmitting face is oriented substantially parallel to a lateral face, in order in this way to minimize the space requirement of the housing.

Furthermore, it is advantageous if the first lateral face and the second lateral face have a common edge. This allows the identification to be read when the material flow object is moving in the first direction or in a direction transverse thereto.

It is advantageous if transmitting faces being transversely in relation to each other are formed by different transmitters of the transmitter device. This allows, for example, the effect to be achieved that, to read an identification, the transmitter and receiver can be positioned with their respective transmitting faces and receiving faces parallel to each other and this parallel positionability with optimized response sensitivity is in this case independent of the direction of movement of the material flow object.

In the case of a variant of an embodiment, to provide the transmitting faces, the transmitter device comprises coils connected parallel. This makes it possible to achieve a situation in which only the coil activated by a receiver radiates, while the other coil, with the transmitting face oriented transversely thereto, does not radiate.

However, it may also be provided that, to provide the transmitting faces, the transmitter device comprises coils connected in series.

If one coil is then activated by means of a receiver, both coils radiate the corresponding identification. This can be used, for example, to carry out a deflection of the direction of movement of the material flow object: if a receiver which is appropriately arranged senses a signal of the transversely lying transmitting face, that is to say the transmitting face which lies transversely in relation to the direction of movement of the material flow object at that moment (with a direction of the normal parallel to this direction of movement), a deflection of the material flow object to its transverse direction of movement can then be initiated as a result.

It may also be provided that a capacitor is connected in series with the coils. This allows the specifically set resonance step-up to be used to amplify the corresponding transmission signal.

It may alternatively be provided that the transversely lying transmitting faces of the transmitter device are provided by a single transmitter and, in particular, the transmitter comprises a bar coil, which is arranged in such a way that it has the same radiation characteristic transversely in relation to a first direction of movement of the material flow object as transversely in relation to a second direction of movement of the material flow object, the first and second directions of movement being transverse to each other. In particular, this bar coil is in this case arranged in a corner of a housing, this corner in turn being aligned with a corner of the material flow object.

A relative position between the transmitter device and the receiver for reading the identification is determined by a linear spacing and a transverse spacing between a transmitting face and the receiver. If code carrier devices and receivers are too far apart, in terms of both the linear spacing and the transverse spacing, the receiver cannot activate the transmitter and, as a result, the transmitter in turn does not transmit an identification.

It is most particularly advantageous if the transmitter device is a passive transmitter device which can be activated by a receiver. As a result, the code carrier device does not have to be provided with a separate electrical supply. The code carrier device can then be mounted on a material flow object without supply lines or the like having to be provided.

In particular, the code carrier can in this case be supplied with energy via an electromagnetic field coupled in by a receiver. In particular, the receiver permanently emits an electromagnetic field with a specific frequency, for example 100 kHz, of a specific power and with a specific radiation characteristic. Once a specific relative positional range between the receiver and code carrier device has been reached, currents are inductively induced in the coils there, and a capacitor which supplies the energy for operating the electrical circuits of the code carrier device is charged. The code word stored in the memory can then be read and a corresponding modulated signal provided, which signal is in turn radiated via the coil, which is now acting as a transmitter, and is registered by the receiver.

It may be provided that the code carrier stores an unalterable identification. It is advantageous if the code carrier can be written by means of a receiver, reading of the identification and writing of a new identification taking place in particular in different frequency ranges.

In the case of writing by a receiver (writing coil), a transmitting face of the code carrier device provides a receiving face for the writing signals for writing on the code carrier.

In the case of a variant of an embodiment, a first transmitting face, a second transmitting face and a third transmitting face, which respectively are transversely in relation to one another, are provided. This allows the identification to be read when the material flow object is moved in three different directions of movement, lying transversely in relation to one another, with the receivers correspondingly positioned.

In particular, a housing of the code carrier device is in such a way and the transmitting areas are oriented in such a way that the latter lie substantially in the possible directions of movement of the material flow object. This allows the identification to be read in each direction of movement of the material flow object—with correspondingly positioned receivers (reading head coils).

The following description of preferred embodiments serves in conjunction with the drawing for a more detailed explanation of the invention.

DETAILED DESCRIPTION OF THE INVENTION

Figure 1:
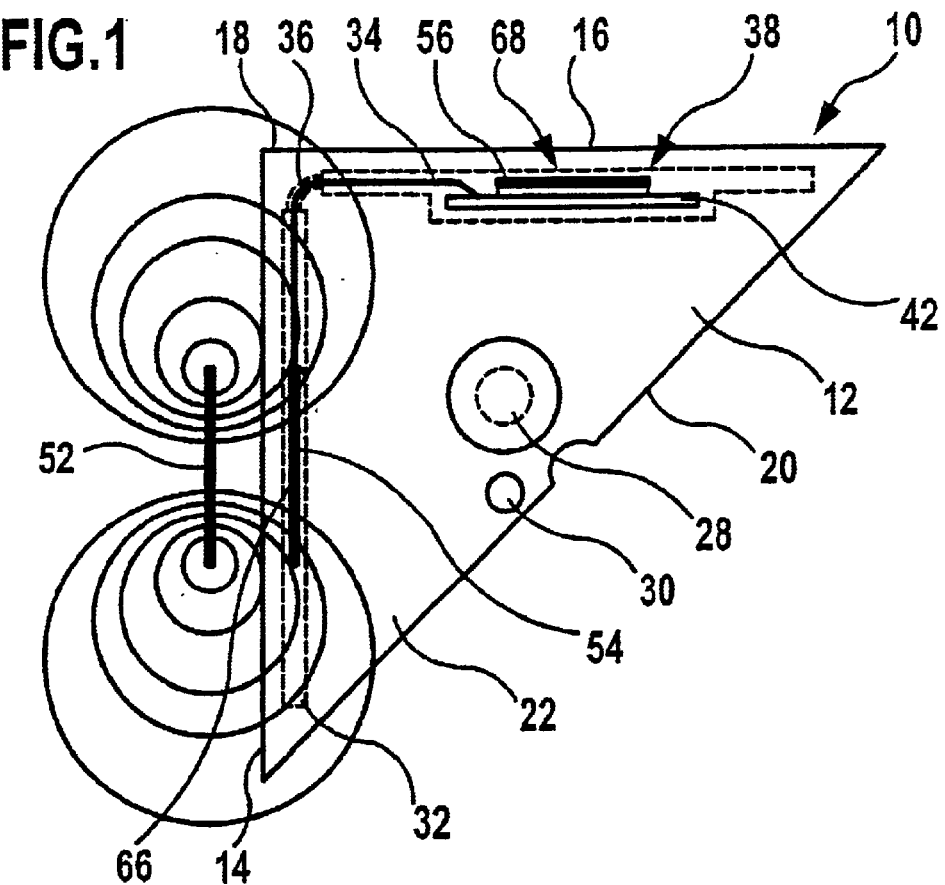
FIG. 1 shows a plan view of a first exemplary embodiment of a code carrier device in accordance with the invention, a receiver also being schematically shown.

A first exemplary embodiment of a code carrier device in accordance with the invention, which is shown in FIG. 1 and is designated there as a whole by 10, comprises a housing 12, which is triangular in cross-section, that is to say this housing 12 comprises a first face 14, a second face 16 lying transversely thereto, the first face 14 and second face 16 having a common edge 18, and a third face 20, which joins the two faces 14 and 16 to each other. Furthermore, the housing 12 has a cover face 22 and a base face (not shown in the drawing).

The code carrier device 10 is mounted with the base face downward on a material flow object 24, in particular in the region of a corner 26 of this material flow object 24. This is explained in further detail below on the basis of FIG. 4.

For mounting on the material flow object 24, a cylindrical through-opening 28 is provided, by means of which the housing 12 can be mounted on the material flow object 24 by means of a fixing element, such as a screw or a retention pin for example.

Also provided is a positioning opening 30, via which the housing 12 can be positioned in a rotationally fixed manner on the material flow object 24, that is to say it can be secured against rotation, when an appropriate fixing element has passed through said opening.

Slit-shaped recesses 32 and 34, which are connected to each other by a cable duct 36, are formed in the housing 12 and covered in the upward direction by the cover face 22 and are respectively parallel to the first face 14 and the second face 16.

Figure 2:
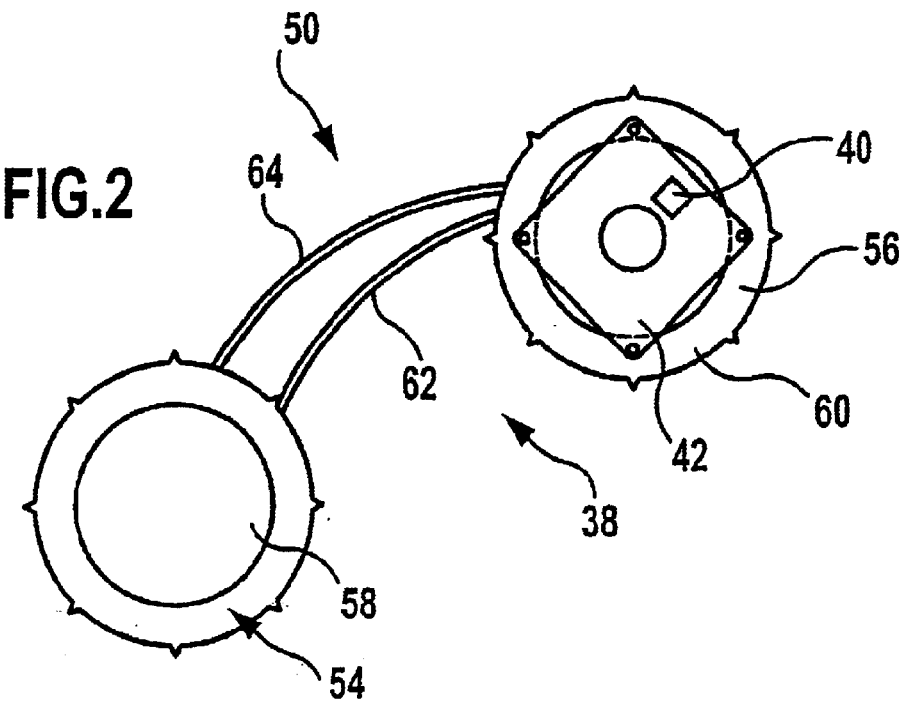
FIG. 2 shows a transmitter device of the code carrier device according to FIG. 1.
Figure 3:
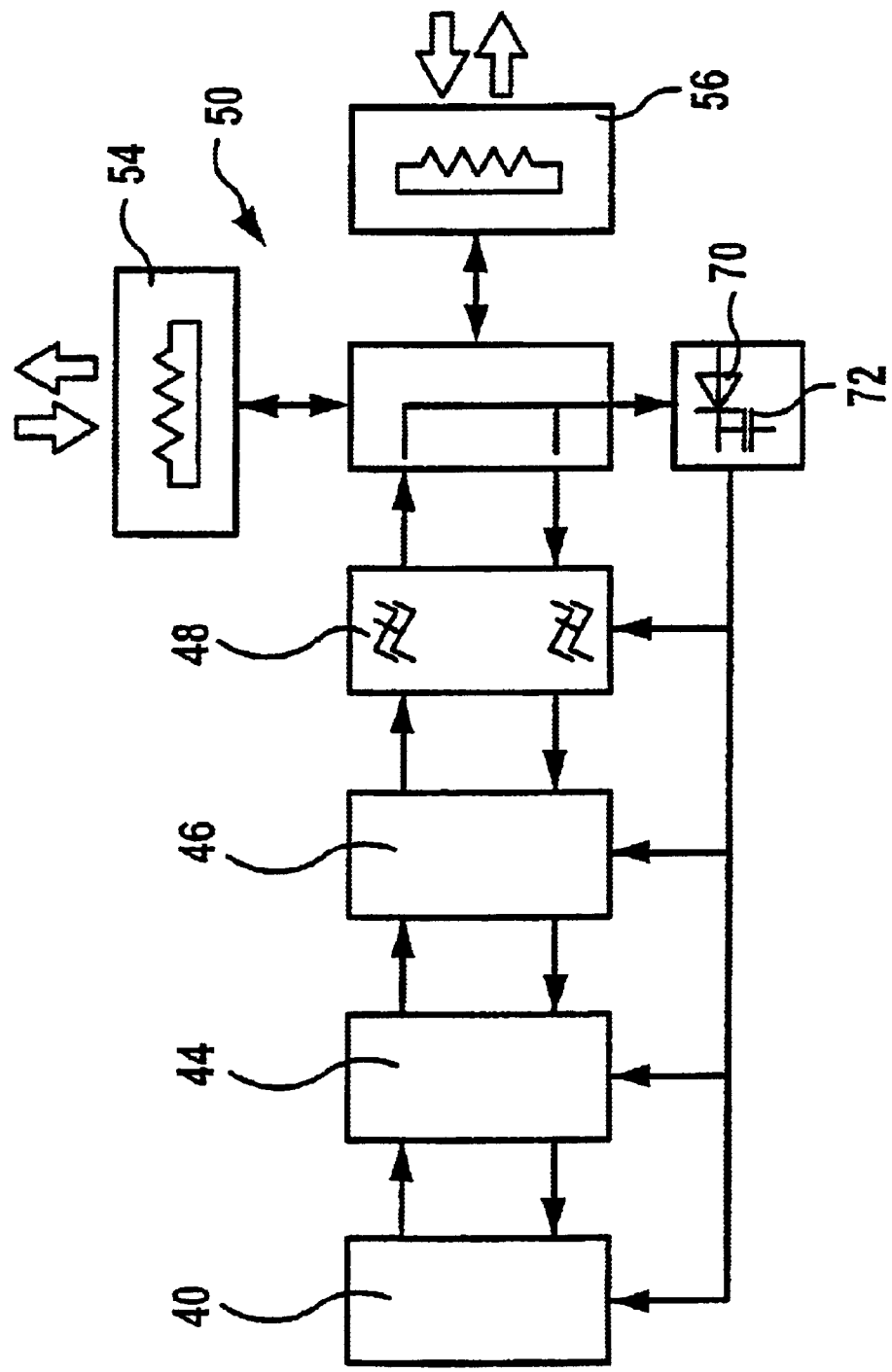
FIG. 3 shows a block diagram of the code carrier device according to FIG. 1.

The code carrier device 10 comprises a code carrier, an embodiment of which, shown in FIG. 2, is designated as a whole by 38. The code carrier has in this case a memory 40, in which an individual code word can be stored, for example as a 64 kB word. The memory 40 is in this case disposed on a printed circuit board 42 with further electronic components. As schematically shown in FIG. 2, these comprise a microcontroller 44, by means of which a code word can be read from the memory, and, if appropriate, if the code carrier 38 is writable, it is possible to write to the memory.

For reading code words and for writing on the code carrier 40, appropriately modulated command signals are fed to the code carrier device 10. In particular, different frequencies are used for the reading and writing of the code carrier 38. Therefore, a modulator/demodulator 46 is provided, in order to modulate signals which are read from the memory 40 via the microcontroller 44, to allow such a signal to be transmitted to a receiver, and on the other hand to demodulate a signal originating from a receiver, to allow a corresponding identification to be read into the memory 40.

Also provided is a filter 48, in order for example to let only narrow frequency ranges through to the modulator/demodulator 46 or to transmit only signals in one frequency range.

The code carrier comprises a transmitter device, which is designated as a whole by 50 and by means of which the identification which is stored in the memory 40 can be contactlessly read by a receiver 52 (FIG. 1). In the case of the first exemplary embodiment, the transmitter device 50 comprises a first toroidal coil 54 and a second toroidal coil 56. The toroidal coils 54 and 56 respectively have in this case housings 58, 60, which are produced from a plastics material. The printed circuit board 42 is located on the housing 60 of the second toroidal coil 56.

Figure 9:
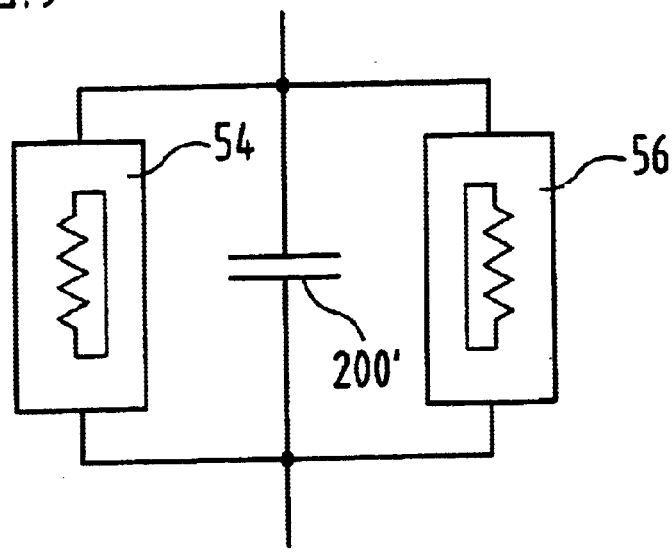
FIG. 9 shows a parallel arrangement of transmitter coils in accordance with an exemplary embodiment of the invention.
Figure 10:
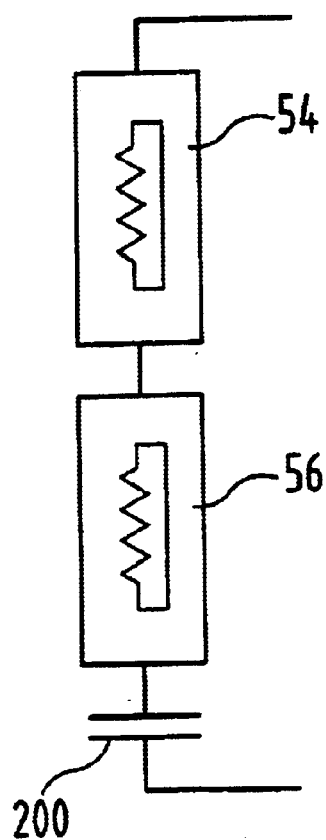
FIG. 10 shows a series arrangement of transmitter coils in accordance with an exemplary embodiment of the invention.

The two toroidal coils 54 and 56 may be connected in parallel (as shown in FIG. 9) or in series (as shown in FIG. 10). Furthermore, a capacitor 200, 200' for stepping up the resonance may be connected in series (FIG. 10) or in parallel (FIG. 9) with the two toroidal coils 54 and 56.

The electrical connection between the two toroidal coils 54 and 56 takes place via flexible cables 62, 64, so that the second toroidal coil 56 with its housing 60 can be put into the recess 34 as a coil receptacle and the first toroidal coil 54 can be put into the recess 32 as a corresponding coil receptacle. The cables 62 and 64 can be led between these two receptacles 32 and 34 via the cable duct 36.

The recess 32 and 34 are formed in such a way that an annular plane of the toroidal coils is oriented substantially parallel to corresponding lateral faces, that is to say an annular area of the first toroidal coil 54 is oriented substantially parallel to the corresponding lateral face of the first face 14, and the annular area of the second toroidal coil 56 is oriented substantially parallel to the corresponding lateral face of the second face 16.

The two toroidal coils 54 and 56 are respectively transmitters of the transmitter device 50. The first toroidal coil 54 has a first transmitting face 66, via which a radiation of energy takes place. In the same way, the second toroidal coil forms a second transmitting face 68, via which the radiation of energy takes place. In the case of a toroidal coil, the energy radiation density is free from nodes. The two toroidal coils 54 and 56 are of substantially the same form and are also activated in the same way, so that they have the same radiation characteristics. Since the annular areas of the two toroidal coils 54 and 56 are oriented transversely in relation to each other, and consequently the transmitting faces 66 and 68 are oriented transversely in relation to each other, the corresponding radiation characteristics do, however, lie transversely in relation to each other: if, for example, a specific first energy flux density vector relative to the first transmitting face 66 (relative to the first toroidal coil 54) is taken and a corresponding second energy flux density vector with respect to the second transmitting face 68 is taken, this second vector having the same relationship to this transmitting face 68 as the first energy flux density vector has with respect to the first transmitting face 66, that is to say the same angle and the same magnitude, these two energy flux density vectors (Poynting vectors) are transverse to each other and, in particular, perpendicular to each other, if the two faces 14 and 16 are perpendicular to each other.

The code carrier 38 is, in particular, a passive code carrier which only after inducement by a receiver, such as a receiver 52 for example, emits corresponding signals. This is schematically shown in FIG. 1:

If, for example, the receiver 52 lies within a specific relative positional range with respect to the linear spacing and transverse spacing in relation to the first toroidal coil 54, the field energy radiated from it is great enough to excite the first toroidal coil 54 for oscillation. As a result, the code carrier 38 picks up energy from the electromagnetic field of the receiver 52. The corresponding inductively generated current is passed via a diode 70 to a capacitor 72, which temporarily stores the energy. This capacitor is connected to the memory 40, the microcontroller 44, the modulator/demodulator 46 and the filter 48, which it supplies with electrical energy. The energy provided has the effect in turn that the corresponding circuit begins to operate, that is to say the microcontroller reads the code word stored in the memory 40 and then the current fed to the first toroidal coil 54 is modulated by means of the modulator/demodulator 46 in such a way that the code word can be read by the receiver 52 in the signal radiated from this transmitter 54 via the first transmitting face 66.

The receiver 52 in this case advantageously likewise comprises a toroidal coil, the receiver 52 preferably being positioned in relation to the material flow object 24 in such a way and the housing 12 in turn being disposed on the material flow object 24 in such a way that the toroidal coil of the receiver 52 and a corresponding toroidal coil 54 or 56 of the code carrier device 10 are aligned parallel to each other when there is a specific direction of movement of the material flow object 24.

It can be seen from the coune of the flux lines in a snapshot (FIG. 1) that, with a parallel alignment between the receiver 52 and, for example, the first toroidal coil 54, the latter is penetrated particularly well by the lines of flux of the toroidal coil of the receiver 52, so that there is a high response sensitivity. On the other hand, the electrical energy necessary for operating the code carrier 38 can then also be picked up in an effective way by the receiver 52. In the case of this form of the receiver and transmitter device, the toroidal coils 54 and 56 can also be provided with pot core halves (such pot core halves are usually used with installation in steel).

The fact that the first transmitting face 66 and the second transmitting face 68 are transverse to each other allows the code carrier device 10 to radiate in two directions which are transverse to each other. This means that, if it is at a suitable linear spacing and transverse spacing in relation to the first toroidal coil 54, a receiver 52 can read the corresponding identification. If a receiver arranged transversely in relation to the receiver 52 is likewise in a corresponding relative position with respect to the second toroidal coil 56 with its second transmitting face 68, this receiver can also read the code word.

Figure 4:
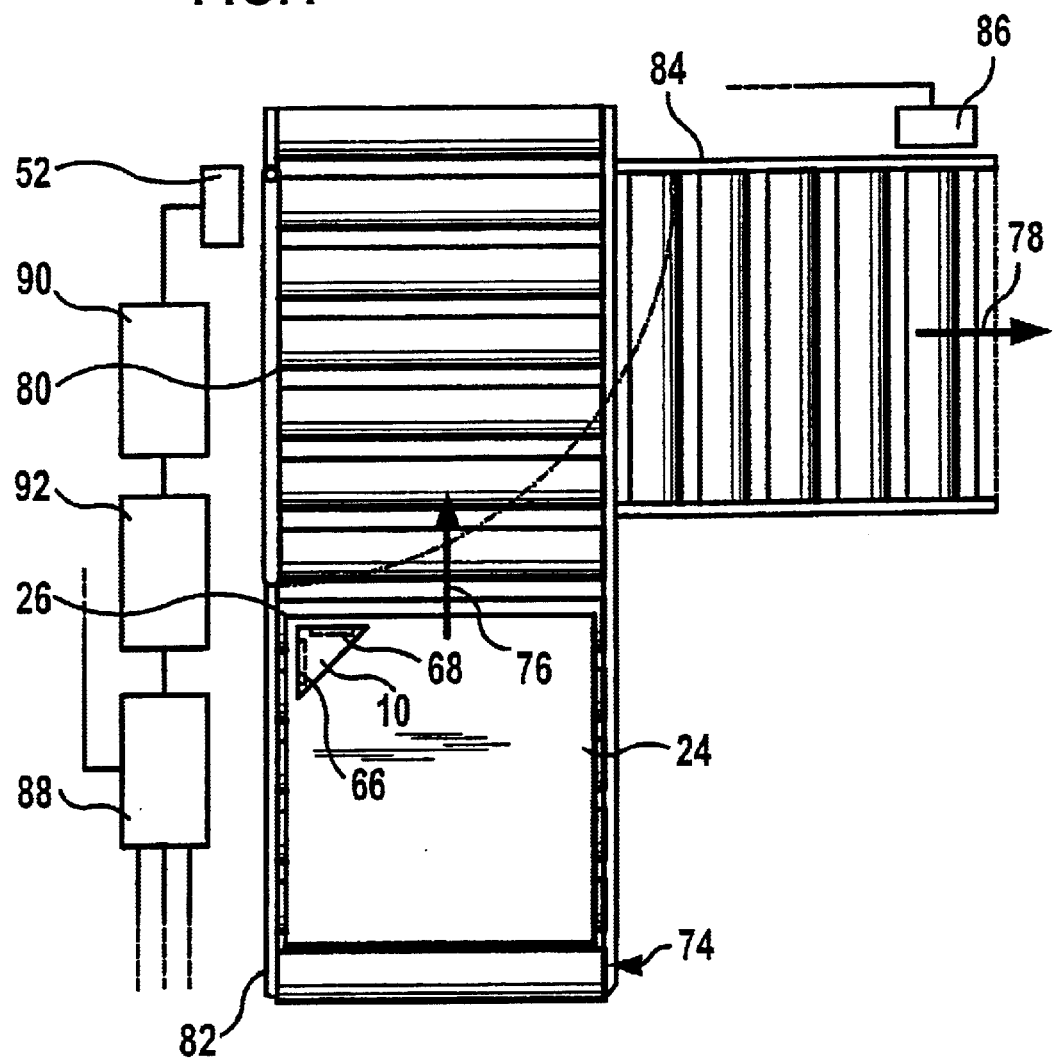
FIG. 4 schematically shows an identification system for material flow objects which are moving on assembly lines, a material flow object being provided with a code carrier device according to FIG. 1.

This makes it possible, as shown in FIG. 4, to read the code word of the code carrier 38 even if the material flow object 24 moves in two different directions:

The material flow object 24 moves on an assembly line 74 in a first direction 76 and in a second direction 78, being transversely thereto. For example, a pivotable barrier arm 80 in combination with a slide (not shown in FIG. 4) allows the direction of movement of the material flow object 24 to be diverted from the direction 76 into the direction 78.

The housing 12 is arranged on the material flow object 24 in such a way that its first face 14 is substantially parallel to the first direction 76 and its second face 16 is substantially parallel to the second direction of movement 78. In particular, the housing 12 is arranged in the vicinity of the corner 26, so that the spacing from a respective edge 82 (parallel to the first direction of movement 76) and 84 (parallel to the second direction of movement 78) is minimized.

The receiver 52 is then arranged at a spacing from the edge 82 and a receiver 86 is disposed at a spacing from the edge 84. The receivers 52, 86 and further receivers are connected to a control device 88, which monitors, for example, the flow of the material flow objects 24, in that it stores and monitors the read identifications of all the material flow objects. Connected downstream of a receiver there is also, for example, a decoder 90 and an evaluation device 92, in order to pass on the received signal in an optimized form to the control device 88.

The identification which is associated with the material flow object 24 can be read by a single code carrier device 10 both when the material flow object 24 is moving in the first direction of movement 76, and is thereby passing the receiver 52, and when the material flow object is moving in the second direction of movement 78, transversely thereto, and is thereby passing the receiver 86. The transverse position of the two transmitting faces 66 and 68 has the effect of ensuring that, when the receivers 52, 86 are appropriately arranged, there is a parallel alignment between the corresponding transmitting faces and the receivers, irrespective of the direction of movement of the material flow object 24. If, for example, the directions of movement 76 and 78 are perpendicular, the two transmitting faces 66 and 68 are aligned perpendicularly to each other in the housing 12, that is to say the two toroidal coils 54 and 56 are aligned perpendicularly to each other in the housing. If the directions of movement 76 and 78 are not perpendicular to each other, but at some other angle, the two transmitting faces 66 and 68 are correspondingly formed in the housing 12, that is to say the two toroidal coils 54 and 56 are arranged with their annular areas at the same angle in relation to each other in the housing 12, which is then also correspondingly formed. As a result, it is ensured that the receivers and transmitting faces are facing one another in parallel when the material flow object 24 correspondingly passes the associated transmitter and, consequently, the response sensitivity is in turn particularly high.

If the two toroidal coils 54 and 56 are connected in parallel in the transmitter device 50 (FIG. 9), it is possible to achieve the effect that only the particular toroidal coil which has been activated by a corresponding transmitter radiates the code word. If the two coils are connected in series (FIG. 10), both coils radiate the code word. By inter-connecting a capacitor 200, 200' in parallel or in series, the resonance step-up can be used to obtain a high signal intensity if the transmitters 54, 56 are correspondingly operated close to their resonant frequency for the code word radiation.

Figure 5:
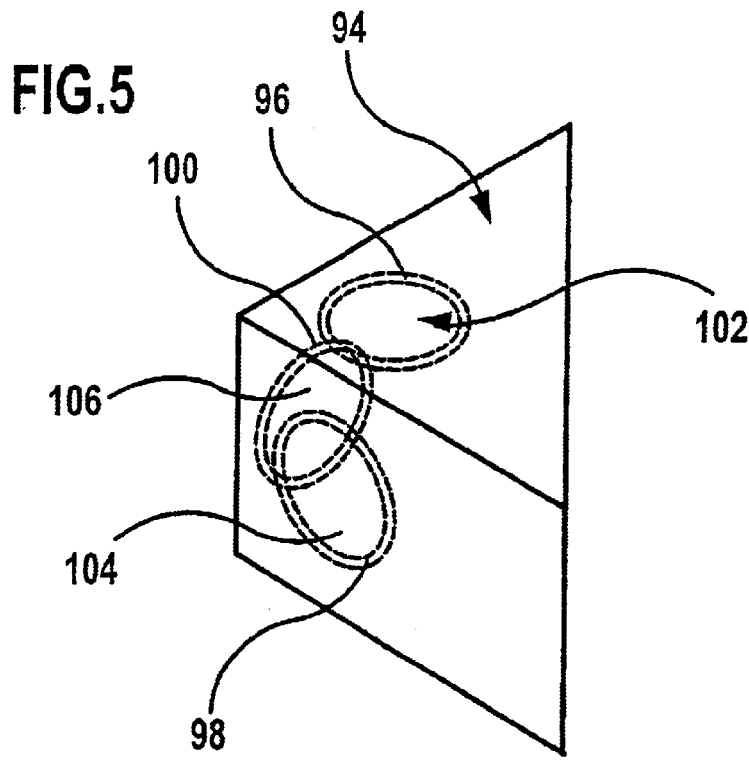
FIG. 5 shows a variant of the first exemplary embodiment of a code carrier device.

In the case of a variant of an embodiment which is shown in FIG. 5, a housing 94 is provided, in which a first toroidal coil 96, a second toroidal coil 98 and a third toroidal coil 100 are arranged with their annular areas in each case transversely in relation to one another. Transmitting faces 102, 104 and 106 formed as a result are then transverse to one another and, for example, perpendicular to one another. In this way, the code word on a material flow object which is moving in a third direction, transversely to the two directions 76 and 78, can also be read. Otherwise, the corresponding code carrier device functions in the way described above.

Figure 6:
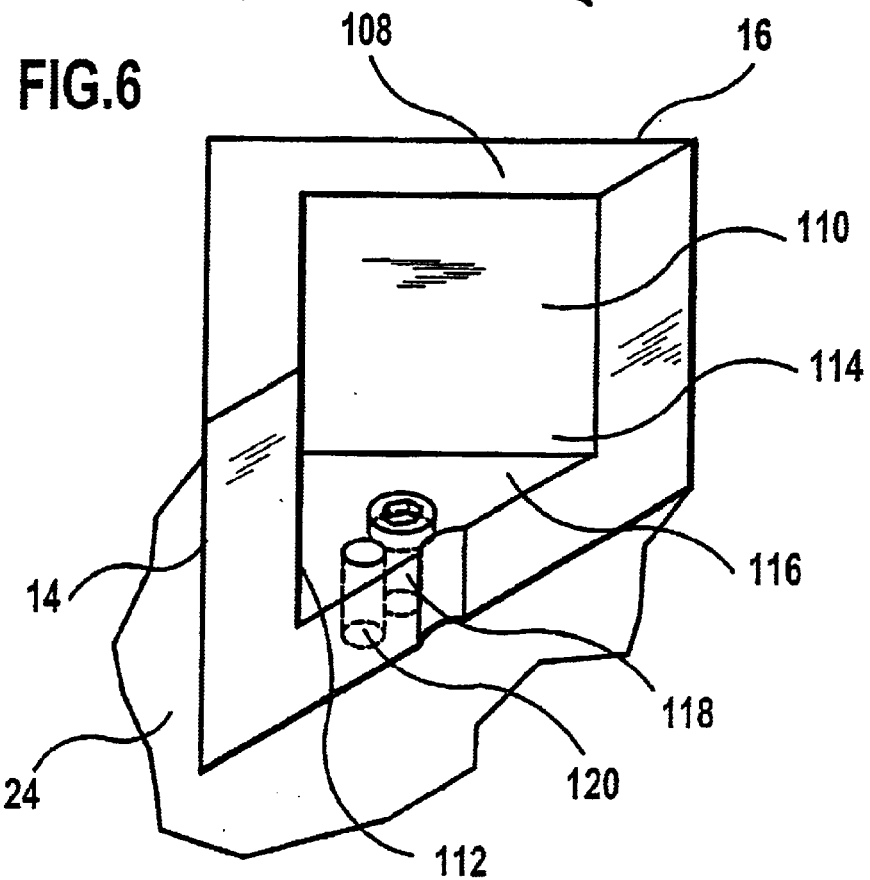
FIG. 6 shows a further variant.

In the case of a further variant of an embodiment, as shown in FIG. 6, a housing 108 is provided, which has a cross-sectionally triangular free space 110, which is bounded by walls 112 and 114 respectively parallel to the first face 14 and second face 16. The free space 110 is bounded in the downward direction by an engagement base 116, in which there is formed an recess 118, via which in turn, as described above, this housing 108 can be connected to a material flow object 24 by means of a fixing element. Furthermore, a recess 120 for a positioning pin is provided.

The free space 110 has the effect that the length of the recesses 118 and 120 is shorter than the overall height of the housing 108, so that the fixing elements can correspondingly be made shorter. In a corresponding way, the proportion of "hidden" inside areas, that is the inside areas of the recesses 118 and 120, is also minimized, so that the corresponding housing 108 can also be disinfected more easily.

Figure 7:
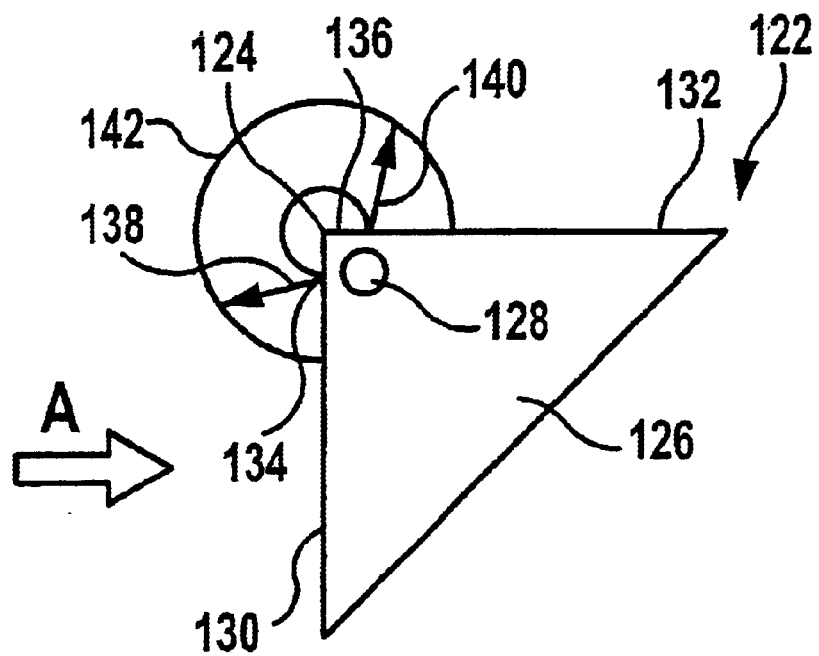
FIG. 7 shows a second exemplary embodiment of a code carrier device according to the invention in plan view.
Figure 8:
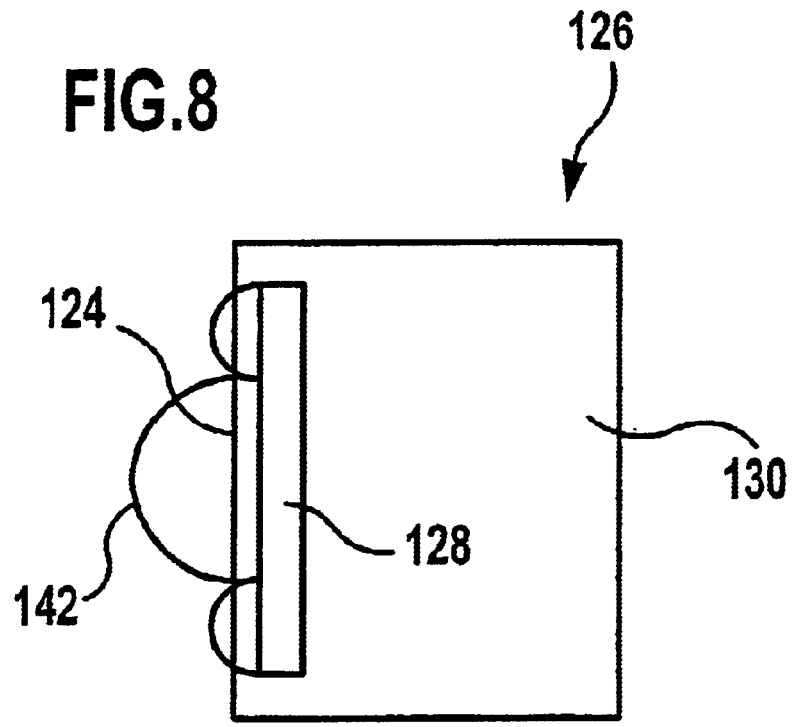
FIG. 8 shows a schematic side view in the direction A of the code carrier device according to FIG. 7.

In the case of a second exemplary embodiment of a code carrier device according to the invention, which is shown in FIGS. 7 and 8 and is designated there as a whole by 122, a bar coil 128 is arranged in the vicinity of an edge 124 within a housing 126, such that it is aligned parallel to the edge.

The edge 124 of the housing 126 is in this case formed by the abutment of two faces 130 and 132, the housing 126 being arranged on the material flow object 124 in such a way that the faces 130 and 132 are aligned in relation to the respective directions of movement 76 and 78. The bar coil 128 has a first transmitting face 134 parallel to the face 130 and a second transmitting face 136 parallel to the face 132. A specific first energy flux density vector 138, relative to the first transmitting face 134, in this case is transversely in relation to a second energy flux density vector 140, which is relative to the second transmitting face 126 and is in the same relationship with the latter as the first energy flux density vector 138 is in relation to the first transmitting face 134.

An energy flux density 142, that is to say the radiation characteristic, of such a bar coil 128 has nodes.

It is also the case with the code carrier device 122 that the same identification can be read irrespective of whether the material flow object 24 is moving in the first direction 76 or in the second direction 78, as long as it passes by a corresponding receiver. Otherwise, the code carrier device 122 functions in the same way as described above in conjunction with the first exemplary embodiment.

What is claimed is:

1. A code carrier device for mounting on a material flow object, comprising
   a code carrier having a memory for storing an individual identification; and
   a transmitter device for transmitting the identification, so that the identification is contactlessly readable by a receiver when the transmitter device and receiver are in a specific relative positional range in relation to each other;
   wherein the transmitter device has a first transmitting face and at least a second transmitting face being arranged transversely to the first transmitting face, by means of which transmitting faces said identification is readable, respectively, the readability being determined by the relative position between a receiver and a transmitting face.

2. The code carrier device as claimed in claim 1, wherein a specific first energy flux density vector of the radiation, which is related to the first transmitting face, and a second energy flux density vector, which is related to the second transmitting face and which is in the same relationship with the second transmitting face and as the first energy flux density vector is with the first transmitting face, are transversely in relation to each other.

3. The code carrier device as claimed in claim 1, wherein a transmitter of the transmitter device which provides a transmitting face comprises a coil.

4. The code carrier device as claimed in claim 3, wherein a transmitter comprises a toroidal coil.

5. The code carrier device as claimed in claim 1, wherein an energy flux density associated with a transmitting face is node-free.

6. The code carrier device as claimed in claim 1, wherein the transmitter device is arranged in a housing.

7. The code carrier device as claimed in claim 6, wherein the first transmitting face is arranged with respect to a first lateral face of the housing and the second transmitting face is arranged with respect to a second lateral face, which is transversely in relation to the first lateral face.

8. The code carrier device as claimed in claim 7, wherein a transmitting face is oriented substantially parallel to a lateral face.

9. The code carrier device as claimed in claim 7, wherein the first lateral face and the second lateral face have a common edge.

10. The code carrier device as claimed in claim 1, wherein transmitting faces being transversely in relation to each other are formed by different transmitters of the transmitter device.

11. The code carrier device as claimed in claim 1, wherein, to provide the transmitting faces, the transmitter device comprises coils connected in parallel.

12. The code carrier device as claimed in claim 11, wherein a capacitor is connected in series with the coils.

13. The code carrier device as claimed in claim 1, wherein a housing of the code carrier device is such a way and mounted on the material flow object in such a way and the transmitting faces are oriented in such a way that the transmitting faces are arranged substantially in the possible directions of movement of the material flow object.

14. The code carrier device as claimed in claim 1, wherein the transversely arranged transmitting faces of the transmitter device are provided by a single transmitter.

15. The code carrier device as claimed in claim 14, wherein the transmitter comprises a bar coil, which is arranged in such a way that it has the same radiation characteristic transversely in relation to a first direction of movement of the material flow object as transversely in relation to a second direction of movement of the material flow object, the first and second directions of movement being transverse to each other.

16. The code carrier device as claimed in claim 1, wherein a relative position between the transmitter device and the receiver for reading the identification is determined by a linear spacing and a transverse spacing between a transmitting face and the receiver.

17. The code carrier device as claimed in claim 1, wherein the transmitter device is a passive transmitter device which is actuatable by a receiver.

18. The code carrier device as claimed in claim 17, wherein the code carrier is suppliable with energy via an electromagnetic field coupled in by a receiver.

19. The code carrier device as claimed in claim 1, wherein the code carrier is writable by means of a receiver.

20. The code carrier device as claimed in claim 19, wherein a transmitting face provides a receiving face for the writing signals for writing on the code carrier.

21. The code carrier device as claimed in claim 1, wherein a first transmitting face, a second transmitting face and a third transmitting face, which respectively are transversely in relation to one another, are provided.

22. The code carrier device as claimed in claim 1, wherein, to provide the transmitting faces, the transmitter device comprises coils connected in series.

23. The code carrier device as claimed in claim 22, wherein a capacitor is connected in series with the coils.

* * * * *

UNITED STATES PATENT AND TRADEMARK OFFICE
CERTIFICATE OF CORRECTION

PATENT NO. : 6,799,722 B2
DATED : October 5, 2004
INVENTOR(S) : Reuker

It is certified that error appears in the above-identified patent and that said Letters Patent is hereby corrected as shown below:

Title page,
Item [73], Assignee, should read
-- [73]  Assignee:     Balluff GmbH, Neuhausen (DE) --

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,799,722 B2
DATED : October 5, 2004
INVENTOR(S) : Reuker

It is certified that error appears in the above-identified patent and that said Letters Patent is hereby corrected as shown below:

<u>Title page,</u>
Item [73], correct the Assignee name to read: -- [73] Assignee: BALLUFF GmbH, Neuhausen (DE) --

Signed and Sealed this

Ninth Day of August, 2005

JON W. DUDAS
*Director of the United States Patent and Trademark Office*